United States Patent
Kaneko et al.

(10) Patent No.: US 10,967,866 B2
(45) Date of Patent: Apr. 6, 2021

(54) POWER-TRAIN CONTROLLING APPARATUS AND METHOD OF CONTROLLING POWER TRAIN

(71) Applicant: SUBARU CORPORATION, Tokyo (JP)

(72) Inventors: Atsushi Kaneko, Tokyo (JP); Tatsuya Nishizawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/674,453

(22) Filed: Nov. 5, 2019

(65) Prior Publication Data
US 2020/0180630 A1   Jun. 11, 2020

(30) Foreign Application Priority Data
Dec. 10, 2018 (JP) .............................. JP2018-230583

(51) Int. Cl.
*B60W 10/02* (2006.01)
*B60W 10/06* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC ...... B60W 10/02; B60W 10/06; B60W 10/08; B60W 20/16; B60W 20/40; B60W 20/00;
(Continued)

(56) References Cited

U.S. PATENT DOCUMENTS 8,831,818 B2 * 9/2014 Park .................. F01N 11/007
                                                701/29.7
8,862,309 B2 * 10/2014 Wehmeier ............... F01N 11/00
                                                701/29.1
(Continued)

FOREIGN PATENT DOCUMENTS

JP          2010-7534 A      1/2010
JP        2016-164049 A      9/2016
(Continued)

*Primary Examiner* — Edwin A Young
(74) *Attorney, Agent, or Firm* — Troutman Pepper Hamilton Sanders LLP

(57) ABSTRACT

A power-train controlling apparatus controls a power train of an engine electric hybrid vehicle. The power train is provided with an engine, a catalytic converter, an oxygen-level sensor, an engaging element, and an electric rotating machine. The power-train controlling apparatus includes a fuel injection controller, a catalyst diagnosing unit, and an engaging-element controller. The fuel injection controller stops fuel injection to the engine during coasting of the vehicle while the engaging element is engaged, introduces oxygen to the catalytic converter, and resumes the fuel injection in a fuel-rich state while the vehicle is running. The catalyst diagnosing unit diagnoses the catalytic converter after the resuming of the fuel injection. The engaging-element controller prohibits transition of the engaging element to a released state during a period between the stopping of the fuel injection and completion of the diagnosing of the catalytic converter.

7 Claims, 5 Drawing Sheets

(51) Int. Cl.
*B60W 10/08* (2006.01)
*B60W 30/18* (2012.01)
*B60W 20/00* (2016.01)
*F01N 3/20* (2006.01)

(52) U.S. Cl.
CPC ............ *B60W 10/08* (2013.01); *B60W 20/00* (2013.01); *F01N 3/2093* (2013.01); *B60W 2030/18081* (2013.01); *B60W 2710/021* (2013.01); *B60W 2710/0627* (2013.01); *B60W 2710/08* (2013.01)

(58) Field of Classification Search
CPC . B60W 30/18072; B60W 2030/18081; B60W 2530/12; B60W 2710/021; B60W 2710/0627; B60W 2710/08; F01N 3/2093
See application file for complete search history.

(56) References Cited

U.S. PATENT DOCUMENTS

2013/0296125 A1* 11/2013 Gibson ................ B60W 20/10
477/5
2016/0355174 A1* 12/2016 Lee .................... F02D 41/1454

FOREIGN PATENT DOCUMENTS

| JP | 2016-223406 A | 12/2016 |
| JP | 2018-24392 A | 2/2018 |

* cited by examiner

POWER-TRAIN CONTROLLING APPARATUS AND METHOD OF CONTROLLING POWER TRAIN

CROSS-REFERENCE TO RELATED APPLICATIONS

The present application claims priority from Japanese Patent Application No. 2018-230583 filed on Dec. 10, 2018, the entire contents of which are hereby incorporated by reference.

BACKGROUND

The disclosure relates to a power-train controlling apparatus and a method of controlling a power train, particularly to a power-train controlling apparatus for an engine electric hybrid vehicle and a method of controlling a power train of an engine electric hybrid vehicle.

A known diagnostic method for diagnosing the deterioration of a three-way catalyst typically used on vehicles is based on the characteristics of the catalyst in which the oxygen storage capacity (OSC) decreases as the catalyst deteriorates. The diagnostic method determines the deterioration of the catalyst when the estimated value of OSC falls below a predetermined threshold.

The target catalyst of the diagnostic method is placed in a lean atmosphere and then in a rich atmosphere. Then, the estimated OSC value of the catalyst is calculated from the amount of oxygen released during transition from the lean atmosphere to the rich atmosphere.

SUMMARY

An aspect of the disclosure provides a power-train controlling apparatus configured to control a power train of an engine electric hybrid vehicle. The power-train is provided with an engine, a catalytic converter, an oxygen-level sensor, an engaging element, and an electric rotating machine. The catalytic converter is coupled with the engine and configured to receive exhaust gas of the engine. The oxygen-level sensor is disposed downstream of the catalytic converter along a flow of the exhaust gas and configured to detect an oxygen level of the exhaust gas. The engaging element is disposed in a power transmission path through which an output torque of the engine is transmitted to a wheel. The engaging element is configured to switch between an engaged state in which torque transmission is established between the engine and the wheel and a released state in which the torque transmission is blocked. The electric rotating machine is coupled with the engine and configured to receive the output torque of the engine and generate regenerative power. The power-train controlling apparatus includes: a fuel injection controller configured to stop fuel injection to the engine during coasting of the vehicle while the engaging element is in the engaged state, introduce a predetermined volume of oxygen to the catalytic converter, and resume the fuel injection in a fuel-rich state while the vehicle is running; a catalyst diagnosing unit configured to diagnose the catalytic converter on a basis of a variation in an output of the oxygen-level sensor after the resuming of the fuel injection by the fuel injection controller; and an engaging-element controller configured to prohibit transition of the engaging element to the released state during a period between the stopping of the fuel injection and completion of the diagnosing of the catalytic converter by the catalyst diagnosing unit.

Another aspect provides a method of controlling a power train of an engine electric hybrid vehicle. The power train is provided with an engine and an electric rotating machine configured to receive an output torque from the engine and generate regenerative power. The method includes: performing fuel cut that stops fuel injection to the engine during coasting of the vehicle in a state in which torque is transmittable from the engine to a wheel; resuming the fuel injection in a fuel-rich state while the vehicle is running after introducing, through the fuel cut, a predetermined volume of oxygen to a catalytic converter that processes exhaust gas from the engine; detecting an oxygen level of the exhaust gas downstream of the catalytic converter after the resuming of the fuel injection; diagnosing a catalyst deterioration state of the catalytic converter on a basis of a detected oxygen level of the exhaust gas; and maintaining the state in which the torque is transmittable during a period between the stopping of the fuel injection and completion of the diagnosing of the catalytic converter.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the disclosure will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
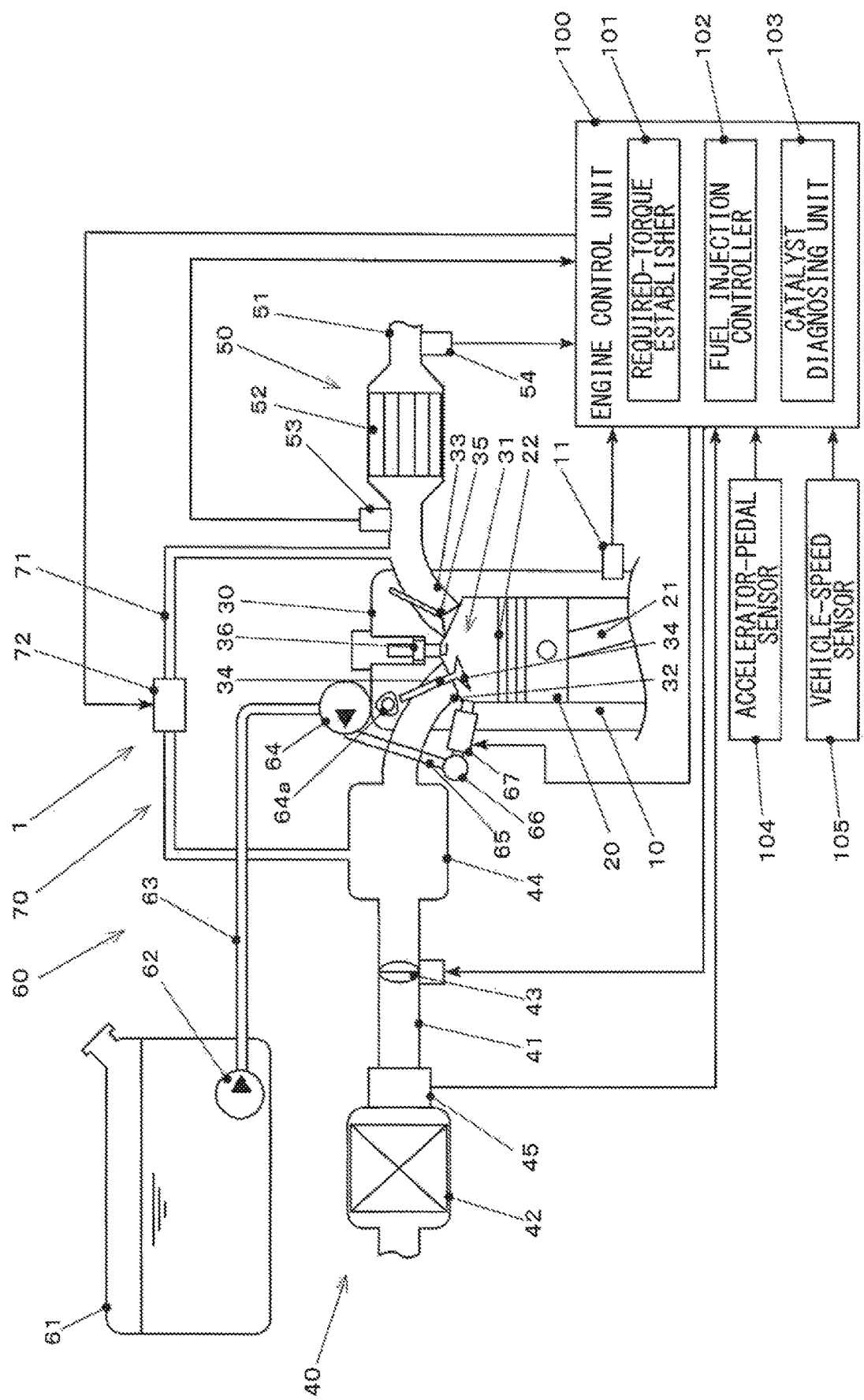
FIG. 1 illustrates the configuration of an engine and its peripherals to which a power-train controlling apparatus according to an embodiment of the disclosure is applied.

A power-train controlling apparatus according to an embodiment of the disclosure may be mounted on an engine electric hybrid vehicle, for example. The engine electric hybrid vehicle may be an automobile or a passenger car. The power-train controlling apparatus controls a power train including an engine and an electric motor, for example. In one example, the power train may include a 4-stroke direct injection engine and a motor generator. The power-train controlling apparatus performs a deterioration diagnosis of a catalytic converter that processes exhaust gas from the engine. FIG. 1 illustrates the configuration of an engine 1 and its peripherals of the power train to which the power-train controlling apparatus according to an embodiment is applied. The engine 1 may include a cylinder 10, a piston 20, a cylinder head 30, an intake system 40, an exhaust system 50, a fuel supply system 60, an exhaust gas recirculation (EGR) system 70, and an engine control unit 100.

The cylinder 10 may include a sleeve that receives the piston 20. The cylinder 10 may be integrated with a crankcase (not illustrated) into a cylinder block. The crankcase may rotatably support and accommodates a crankshaft (not illustrated) or an output shaft of the engine 1. The cylinder 10 may be provided with a water temperature sensor 11 that detects the temperature of the cooling water circulating a water jacket disposed around the cylinder head 30 and the sleeve. The output of the water temperature sensor 11 may be transmitted to the engine control unit 100.

The piston 20 may reciprocate inside the sleeve of the cylinder 10. The piston 20 may be coupled with the crankshaft (not illustrated) via a connecting rod 21. The crown face 22 of the piston 20 may operate in cooperation with the cylinder head 30 and constitute a combustion chamber of the engine 1.

The cylinder head 30 may be disposed on the cylinder 10 at the end remote from the crankshaft. The cylinder head 30 may include a combustion chamber 31, an intake port 32, an exhaust port 33, an intake valve 34, an exhaust valve 35, and a spark plug 36.

The combustion chamber 31 may be a recess facing the crown face 22 of the piston 20 and have, for example, a shape of a pent roof. The intake port 32 may be a flow channel through which air for combustion (new air) is introduced to the combustion chamber 31. The exhaust port 33 may be a flow channel through which burned gas or exhaust gas is discharged from the combustion chamber 31. The intake valve 34 and the exhaust valve 35 may open or close the intake port 32 and the exhaust port 33, respectively, at predetermined valve timings. The intake valve 34 and the exhaust valve 35 may be driven by a valve drive system, such as a cam shaft or a rocker arm. The spark plug 36 may generate a spark during a predetermined spark time in response to an ignition signal generated by the engine control unit 100, to ignite an air-fuel mixture. The spark plug 36 may be disposed at the substantial center of the combustion chamber 31 at the central axis of the cylinder 10 or its vicinity.

The intake system 40 may introduce air for combustion to the engine 1. The intake system 40 may include an intake duct 41, an air cleaner 42, a throttle 43, an intake manifold 44, and an air flowmeter 45. The intake duct 41 may be a pipe conduit through which air from the atmosphere is taken in and supplied to the engine 1. The air cleaner 42 may be disposed near the inlet of the intake duct 41 to filter and clean dust and like in the air. The throttle 43 may be disposed in the intake duct 41 downstream of the air cleaner 42. The throttle 43 may control the output of the engine 1 by reducing the volume of intake air. The throttle 43 may include a valve body, such as a butterfly valve, an electric actuator or throttle actuator that drives the valve body, and a throttle sensor that detects the throttle position. The throttle actuator may be driven in accordance with control signals from the engine control unit 100. The intake manifold 44 is disposed downstream of the throttle 43. The intake manifold 44 may include a container-like surge tank and a branched pipe coupled with the intake port 32 of each engine cylinder and receiving new air. The air flowmeter 45 may be disposed downstream of the air cleaner 42. The air flowmeter 45 may be an intake air sensor that measures the flow rate of air passing through the intake duct 41 or the intake flow rate of the engine 1. The outputs of the air flowmeter 45 may be sequentially transmitted to the engine control unit 100.

The exhaust system 50 may discharge exhaust gas from the engine 1. The exhaust system 50 may include an exhaust pipe 51, a catalytic converter 52, an air-fuel ratio sensor 53, and a rear O2 sensor 54, for example. The exhaust pipe 51 may be a pipe conduit through which exhaust gas from the exhaust port 33 is discharged. The catalytic converter 52 may be disposed in the middle section of the exhaust pipe 51. The catalytic converter 52 may include a honeycomb alumina support supporting a noble metal, such as platinum or rhodium, and a three-way catalyst for purifying HC, NOx, CO, and the like.

The air-fuel ratio (A/F) sensor 53 may be a lambda sensor having linear output that detects the current rate λ of excess air in the engine 1 on the basis of the properties of the exhaust gas. The air-fuel ratio sensor 53 may be disposed in the exhaust pipe 51 upstream of the catalytic converter 52.

The rear O2 sensor 54 detects the oxygen content in the exhaust gas that has passed through the catalytic converter 52. The rear O2 sensor 54 may be, for example, a zirconia cylinder body having inner and outer faces coated with platinum, in which the inner face is exposed to the atmosphere, and the outer face is exposed to the exhaust gas. The rear O2 sensor 54 may generate an electromotive force caused by a difference in oxygen content. The rear O2 sensor 54 may have a property in which a voltage is generated when the air-fuel ratio indicates a concentration of fuel higher than that of the stoichiometric ratio, i.e., rich in fuel and too lean in oxygen, whereas substantially no voltage is generated when the air-fuel ratio indicates a concentration of fuel lower than that of stoichiometric ratio, i.e., lean in fuel and too rich in fuel. The rear O2 sensor 54 is disposed in the exhaust pipe 51 downstream of the catalytic converter 52. In one embodiment of the disclosure, the rear O2 sensor 54 may serve as an "oxygen-level sensor".

The fuel supply system 60 may include a fuel tank 61, a feed pump 62, a fuel carrier pipe 63, a high-pressure pump 64, a fuel pipe 65, a delivery pipe 66, and an injector 67, for example. The fuel tank 61 may be a container for holding fuel or gasoline and may be mounted, for example, below the floor of the rear portion of the vehicle. The feed pump or low-pressure pump 62 may pump the fuel in the fuel tank 61 to the high-pressure pump 64 through the fuel carrier pipe 63. The high-pressure pump 64 may boost the fuel from the feed pump 62 to a high pressure and feed the boosted fuel through the fuel pipe 65 to the delivery pipe 66 also serving as an accumulator. The high-pressure pump 64 may be disposed on the cylinder head 30 and may be driven by a cam shaft 64a driving the intake valve 34.

The injector 67 may include a needle valve driven by an actuator including, for example, a solenoid or a piezoelectric device. The injector 67 may inject a predetermined volume of high-pressure fuel accumulated in the delivery pipe 66 during a predetermined time in accordance with an ejection signal or valve opening signal generated by the engine control unit 100. The volume of fuel to be injected by the injector 67 may be basically set under feedback control using values detected by the air-fuel ratio sensor 53 and the rear O2 sensor 54 such that the air-fuel ratio is kept within a window of the three-way catalyst or near the stoichiometric ratio. During coasting of the vehicle, the accelerator opening may be smaller than or equal to a predetermined opening (in this example, the accelerator is turned off) and fuel may be cut to stop the injection of fuel. During application of high load or catalyst neutralization control described below, the air-fuel ratio is fuel-rich compared with the stoichiometric ratio.

The EGR system 70 may extract exhaust gas flowing through the exhaust pipe 51 and introduce or circulate the extracted exhaust gas to the intake manifold 44. The EGR system 70 may include an EGR pipe conduit 71 and an EGR valve 72, for example. The EGR pipe conduit 71 may transport exhaust gas from the exhaust pipe 51 to the intake manifold 44. One end of the EGR pipe conduit 71 may be coupled with the upstream portion of the catalytic converter 52 in the exhaust pipe 51. The other end of the EGR pipe conduit 71 may be coupled with the surge tank of the intake manifold 44. The EGR valve 72 may be disposed in the middle section of the EGR pipe conduit 71 and control the flow rate of the exhaust gas passing through the EGR pipe conduit 71. The EGR valve 72 may be opened or closed in response to a control signal from the engine control unit 100.

The engine control unit (ECU) 100 may comprehensively control the engine 1 and its auxiliaries. The engine control unit 100 may include an information processor, such as a central processing unit (CPU), memories, such as a random-access memory (RAM) and a read-only memory (ROM), an input/output interface, and a bus connecting these components.

The engine control unit 100 may include a required-torque establisher 101, a fuel injection controller 102, and a catalyst diagnosing unit 103. The engine control unit 100 may be directly connected with an accelerator-pedal sensor 104, a vehicle-speed sensor 105, and other components, or indirectly connected with these components via an in-vehicle local area network (LAN).

The required-torque establisher 101 may establish the torque required for the engine 1 in accordance with the output of the accelerator-pedal sensor 104, the acceleration request from an autonomous driving controller (not illustrated) in the case of an autonomous control mode of the vehicle, an assisting torque generated by a motor generator 190, and other factors. The engine control unit 100 may control the throttle valve opening, the ignition timing, the volume of fuel to be injected, the injection time, the valve timing, the EGR level, etc., so as to cause the actual torque outputted from the engine 1 to be the required torque. The required-torque establisher 101 may serve as a coasting detector that detects coasting of the vehicle when the vehicle is running at a speed higher than a predetermined speed and the required torque is zero, i.e., the accelerator is turned off.

The fuel injection controller 102 may determine the volume of fuel to be injected and the number of times fuel is to be injected in each cycle of the injector 67 of each engine cylinder, and may set the injection time of each fuel injection (the time from the start of fuel injection to the end of fuel injection) on the basis of the intake air volume of the engine 1 detected by the air flowmeter 45, the opening of the throttle valve detected by the throttle sensor, the rotational speed of the crankshaft detected by a crank angle sensor (not illustrated), the outputs from the air-fuel ratio sensor 53 and the rear O2 sensor 54, etc. The fuel injection controller 102 may then send an injection signal or valve opening signal to the injector 67. When the vehicle satisfies a predetermined condition for fuel cut during running or coasting while the required torque is zero, i.e., the accelerator pedal is completely released, the fuel injection controller 102 may perform fuel-cut control to stop fuel injection.

The catalyst diagnosing unit 103 estimates the oxygen storage capacity (OSC) of the catalytic converter 52 and diagnoses the deterioration of the catalytic converter 52 on the basis of the estimated OSC. The function and operation of the catalyst diagnosing unit 103 will be described in detail below.

The accelerator-pedal sensor 104 may detect the operated or depressed amount of the accelerator pedal (not illustrated) when the driver's foot presses down on the accelerator pedal to input an acceleration request. The accelerator-pedal sensor 104 may include an encoder that generates an output signal corresponding to the rotation angle of the accelerator pedal around a support shaft of the accelerator pedal. The output of the accelerator-pedal sensor 104 may be used by the required-torque establisher 101 to establish the required torque and to detect coasting.

The vehicle-speed sensor 105 may generate a vehicle speed signal that periodically varies in accordance with the rotational speed of a wheel. The vehicle-speed sensor 105 may be disposed on a hub bearing housing on which the wheel is rotatably supported. The output signal from the vehicle-speed sensor 105 may be varied by a frequency proportional to the rotational speed of the hub to which the wheel is fixed. The engine control unit 100 may calculate the traveling speed of the vehicle in accordance with the vehicle speed signal generated by the vehicle-speed sensor 105.

Figure 2:
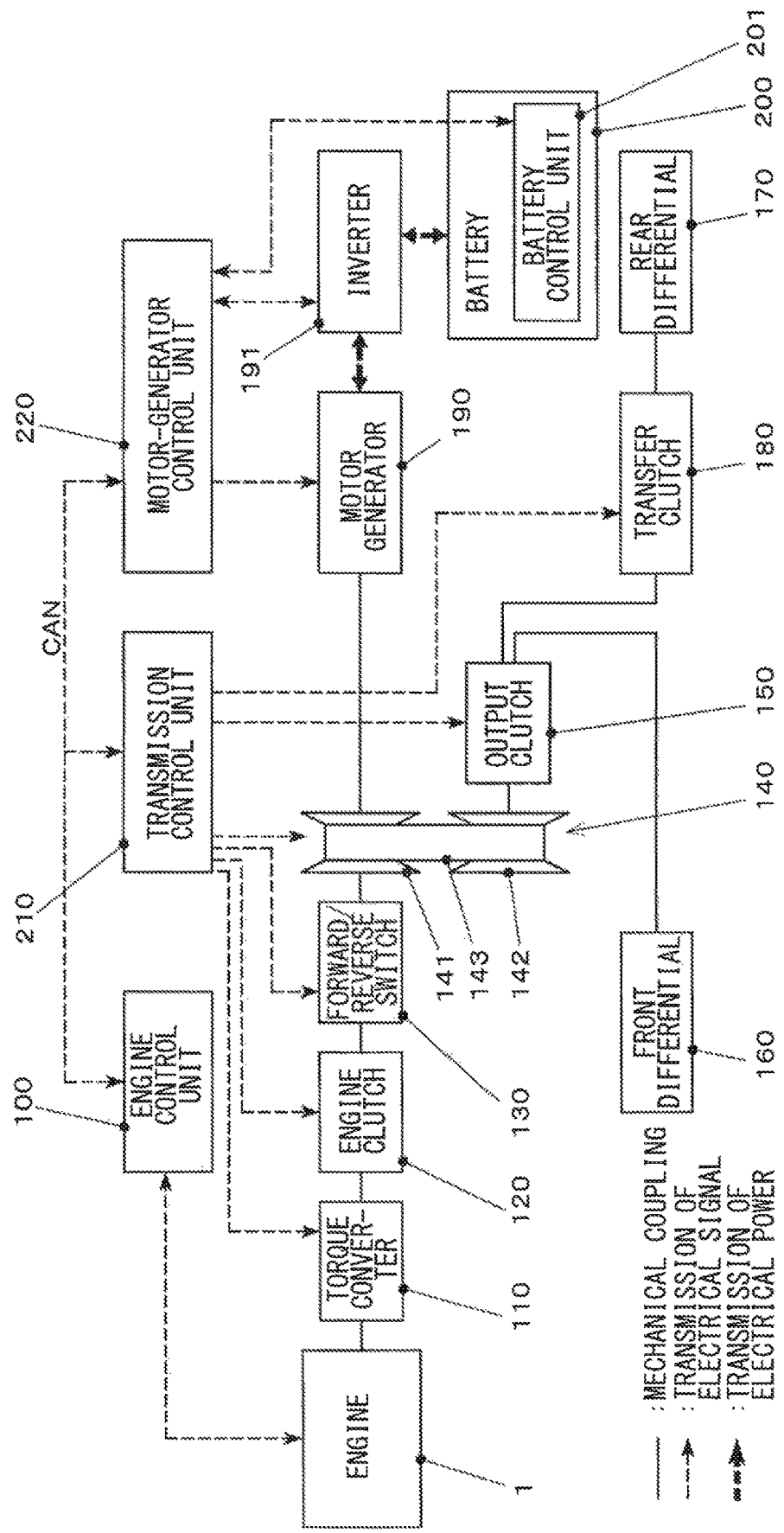
FIG. 2 illustrates the configuration of the power train controlled by the power-train controlling apparatus according to an embodiment of the disclosure.

In this example, the vehicle includes an engine electric hybrid power train described below. FIG. 2 illustrates the configuration of the power train controlled by a power-train controlling apparatus according to this embodiment. The vehicle may be an engine electric hybrid all-wheel drive (AWD) vehicle including, in addition to the engine 1 and the engine control unit 100 described above, a torque converter 110, an engine clutch 120, a forward/reverse switch 130, a variator 140, an output clutch 150, a front differential 160, a rear differential 170, a transfer clutch 180, a motor generator 190, a battery 200, a transmission control unit 210, and a motor-generator control unit 220, for example. The torque outputted from the engine 1 is transmitted to the driven wheels (all wheels in this example) of the vehicle via a power transmission path described below.

The torque converter 110 may be a fluid coupling that transmits the output of the engine 1 to the engine clutch 120. The torque converter 110 may serve as a starting device that transmits engine torque while the vehicle is in a stopped state. The torque converter 110 may be controlled by the transmission control unit 210 and include a lockup clutch (not illustrated) that directly couples the input adjacent to an impeller and the output adjacent to a turbine.

The engine clutch or forward clutch 120 may be disposed between the torque converter 110 and the forward/reverse switch 130. The engine clutch 120 may be an engaging element that couples or engages, or decouples or releases the power transmission path from the engine 1 to a driven wheel between the torque converter 110 and the forward/reverse switch 130. The engine clutch 120 may be released in accordance with an instruction from the transmission control unit 210, for example, in an electric vehicle (EV) driving mode in which the vehicle runs solely on an output from the motor generator 190. The engine clutch 120 may be released when fuel to the engine 1 is cut during a coasting mode in which the driving fully returns the accelerator pedal. During catalyst diagnosis described below, the engaged state of the engine clutch 120 may be maintained even in a coasting mode. This will be described in detail below.

The forward/reverse switch 130 may be disposed between the engine clutch 120 and the variator 140 to switch between a forward mode and a reverse mode in accordance with an instruction from the transmission control unit 210. In the forward mode, the torque converter 110 and the variator 140 may be directly coupled to each other. In the reverse mode, the rotation of the torque converter 110 may be reversed and the reversed output may be transmitted to the variator 140. The forward/reverse switch 130 may include, for example, a planetary gear set and a reverse brake.

The variator 140 may be a transmission mechanism that continuously varies the rotation output of the engine 1 transmitted from the forward/reverse switch 130 and the rotation output of the motor generator 190. The variator 140 may be a chain-type continuously variable transmission (CVT) that includes, for example, a primary pulley 141, a secondary pulley 142, and a chain 143. The primary pulley 141 may be disposed on the input side of the variator 140 during driving of the vehicle, and on the output side during regenerative power generation. The primary pulley 141 may receive the rotation outputs of the engine 1 and the motor generator 190. The secondary pulley 142 may be disposed on the output side of the variator 140 during driving of the vehicle, and on the input side during regenerative power generation. The secondary pulley 142 may be disposed adjacent to the primary pulley 141 and may be rotatable around a rotary shaft disposed parallel to the rotary shaft of the primary pulley 141. The chain 143 may have an annular shape and may be wound around the primary pulley 141 and the secondary pulley 142 to transmit power between the pulleys 141 and 142. The primary pulley 141 and the secondary pulley 142 may each include two sheaves between which the chain 143 is held. The primary pulley 141 and the secondary pulley 142 may each continuously vary the effective diameter by varying the distance between the sheaves in accordance with speed control by the transmission control unit 210.

The output clutch 150 may be disposed between the secondary pulley 142 of the variator 140, the front differential 160, and the transfer clutch 180. The output clutch 150 may couple or decouple the above-described power transmission path with or from these components 142, 160, and 180. The output clutch 150 may be usually in a coupled or engaged state when the vehicle is travelling, and may be in a decoupled or released state when the battery is being charged by driving the motor generator 190 with the output of the engine 1, for example, while the vehicle is stopped.

The front differential 160 may transmit the driving force from the output clutch 150 to the left and right front wheels. The front differential 160 may include a final reduction gear and a differential mechanism that absorbs the difference in the rotational speeds of the left and right front wheels. The output clutch 150 and the front differential 160 may be directly coupled to each other.

The rear differential 170 may transmit the driving force from the output clutch 150 to the left and right rear wheels. The rear differential 170 may include a final reduction gear and a differential mechanism that absorbs the difference in the rotational speeds of the left and right rear wheels.

The transfer clutch 180 may be disposed in a middle section of a rear-wheel driving-force transmission mechanism that transmits a driving force from the output clutch 150 to the rear differential 170. The transfer clutch 180 may couple or decouple the power transmission path between the output clutch 150 and the rear differential 170. The transfer clutch 180 may be, for example, a hydraulic or electromagnetic wet multiplate clutch that continuously varies the engaging force or transmitted torque capacity at the time of coupling. The engaging force of the transfer clutch 180 may be controlled by the transmission control unit 210. The transfer clutch 180 may adjust the driving torque distribution to the front and rear wheels by varying its engaging force. When a difference in the rotational speeds of the front and rear wheels should be allowed during turning of the vehicle, anti-lock control of the brakes, vehicle behavior control, etc., the transfer clutch 180 may reduce or release the engaging force and slip to absorb the difference in the rotational speed.

The motor generator 190 may be an electric rotating machine that generates a driving force for the vehicle while performing regenerative power generation by the torque transmitted from the wheels during deceleration, and regenerates energy. The motor generator 190 may be driven by the output from the engine 1 when the vehicle is traveling or stopped, to generate electricity. The motor generator 190 may be disposed concentrically or coaxially with the primary pulley 141 of the variator 140. The primary pulley 141 may be coupled with a rotor (not illustrated) of the motor generator 190 via a rotary shaft. An example of the motor generator 190 may be a permanent magnet synchronous motor. The output torque of the motor generator 190 when being driven and the regenerative energy level or input torque during regenerative power generation by the motor generator 190 may be controlled by the motor-generator control unit 220.

The motor generator 190 may receive electrical power from the battery 200 via an inverter 191 when being driven. The inverter 191 may convert a direct current (DC) power discharged from the battery 200 to an alternating current (AC) power and may feed the AC power to the motor generator 190. In the same unit as the inverter 191, an AC-DC converter may be provided that converts the AC power output from the motor generator 190 during power generation to a DC power and feeds the DC power to the battery 200 for charging.

The battery 200 may be a secondary battery that feeds electrical power to the motor generator 190 via the inverter 191, and that is charged by electrical power generated by the motor generator 190. A non-limiting examples of the battery 200 may include a lithium-ion battery and a nickel-metal hydride battery. The battery 200 may be, for example, a high voltage battery that has a rated voltage of approximately 300 V. The battery 200 may be primarily used to output electrical power for running the vehicle.

The battery 200 may be provided with an embedded battery control unit 201. The battery control unit 201 may detect the voltage, available output current, temperature, and state of charge (SoC) of the battery cell in the battery 200. The battery control unit 201 may control a cooler (not illustrated) for maintaining the temperature of the battery cell within an appropriate range.

The transmission control unit 210 may comprehensively control the lockup clutch of the torque converter 110, the engine clutch 120, the forward/reverse switch 130, the variator 140, the output clutch 150, the transfer clutch 180, etc. In one embodiment of the disclosure, the transmission control unit 210 may serve as an "engaging-element controller".

The motor-generator control unit 220 may control the output torque, the power generation capacity, etc., of the motor generator 190 as well as the charge/discharge of the battery 200. In one embodiment of the disclosure, the motor-generator control unit 220 may serve as a "regenerative-power-generation controller". The transmission control unit 210 and the motor-generator control unit 220 may each include an information processor, such as a CPU, memories, such as a RAM and a ROM, an input/output interface, and a bus connecting these components. The engine control unit 100, the transmission control unit 210, and the motor-generator control unit 220 may communicate with each other via, for example, a controller area network (CAN) communication system, which is a type of an in-vehicle LAN system, and may transmit information required for cooperative control of the power train.

Deterioration diagnosis of the catalytic converter 52 according to an embodiment will now be described in detail. In this embodiment, the deterioration diagnosis may be a diagnosis of the deterioration of a three-way catalyst that is provided in the catalytic converter 52, and hereinafter referred to as "catalyst deterioration diagnosis." In this example, the catalyst deterioration diagnosis may utilize the richening of air-fuel ratio under catalyst neutralization control performed after fuel cut. When fuel is cut for more than a predetermined time, the catalytic converter 52 may accumulate or store oxygen by a volume corresponding to its oxygen storage capacity (OSC). Under the catalyst neutralization control, fuel may be richened relative to the stoichiometric ratio when fuel injection is resumed, i.e., when idling is resumed after ending fuel cut, and the excess fuel may be reacted with the oxygen stored in the catalytic converter 52 for oxidization or combustion, to cause the catalytic converter to discharge oxygen.

The catalyst neutralization control may be performed until the output of the rear O2 sensor 54 disposed downstream of the catalytic converter 52 switches from an air-fuel ratio on the fuel-lean side or oxygen-rich side to an air-fuel ratio on the fuel-rich side or oxygen-lean side. At this time, the deficient of air that corresponding to the volume of oxygen stored in the catalytic converter 52 may be calculated from the excess fuel relative to the stoichiometric ratio under the catalyst neutralization control, to calculate the estimated OSC value of the catalyst neutralization control. By comparing the estimated OSC value with a predetermined threshold, it is possible to diagnose the deterioration of the catalytic converter 52. In specific, a diagnostic value DV generated on the basis of the estimated OSC may be compared with a preset threshold, and if the diagnostic value DV is smaller than or equal to the threshold, deterioration of the catalytic converter 52 may be determined.

A catalyst monitor value CMV that is an estimated OSC value of the catalytic converter 52 may be determined from Expression 1 below.

In Expression 1, the stoichiometric ratio is 14.7, whereas the air-oxygen ratio by weight is 0.23.

$$CMV = ABS \left\{ \sum \left\{ \left( \frac{ga \times \left(\frac{g}{1000}\right)}{14.7} - \frac{ga \times \left(\frac{g}{1000}\right)}{sglmda \times 14.7} \right) \times 14.7 \times 0.23 \right\} \right\} \times TF$$ [Expression 1]

where ga is the intake flow rate (g/sec), sglmda is the rate of excess air, and TF is a temperature correction term.

The fuel volume at the stoichiometric ratio is calculated by ga/14.7, and the volume of the fuel actually supplied is calculated by ga/14.7×sglmda. The rate of excess air sglmda may be determined on the basis of the output from the air-fuel ratio sensor 53. The volume of excess fuel may be determined by calculating the difference between the fuel volume at the stoichiometric ratio and the volume of the fuel actually supplied. This difference is multiplied by 14.7 to calculate the air deficiency. The air deficiency is multiplied by 0.23 to calculate the oxygen deficiency, which is the volume of oxygen further required for the oxidation or combustion of the entire fuel supplied. Expression 1 integrates the volumes of deficient oxygen from the start of neutralization control when the air-fuel ratio starts to be richened to when the output of the rear O2 sensor 54 switches to the fuel-rich side, to determine the volume of O2 extracted from the catalytic converter 52, which is considered the oxygen storage capacity OSC, to be the catalyst monitor value CMV.

Figure 3:
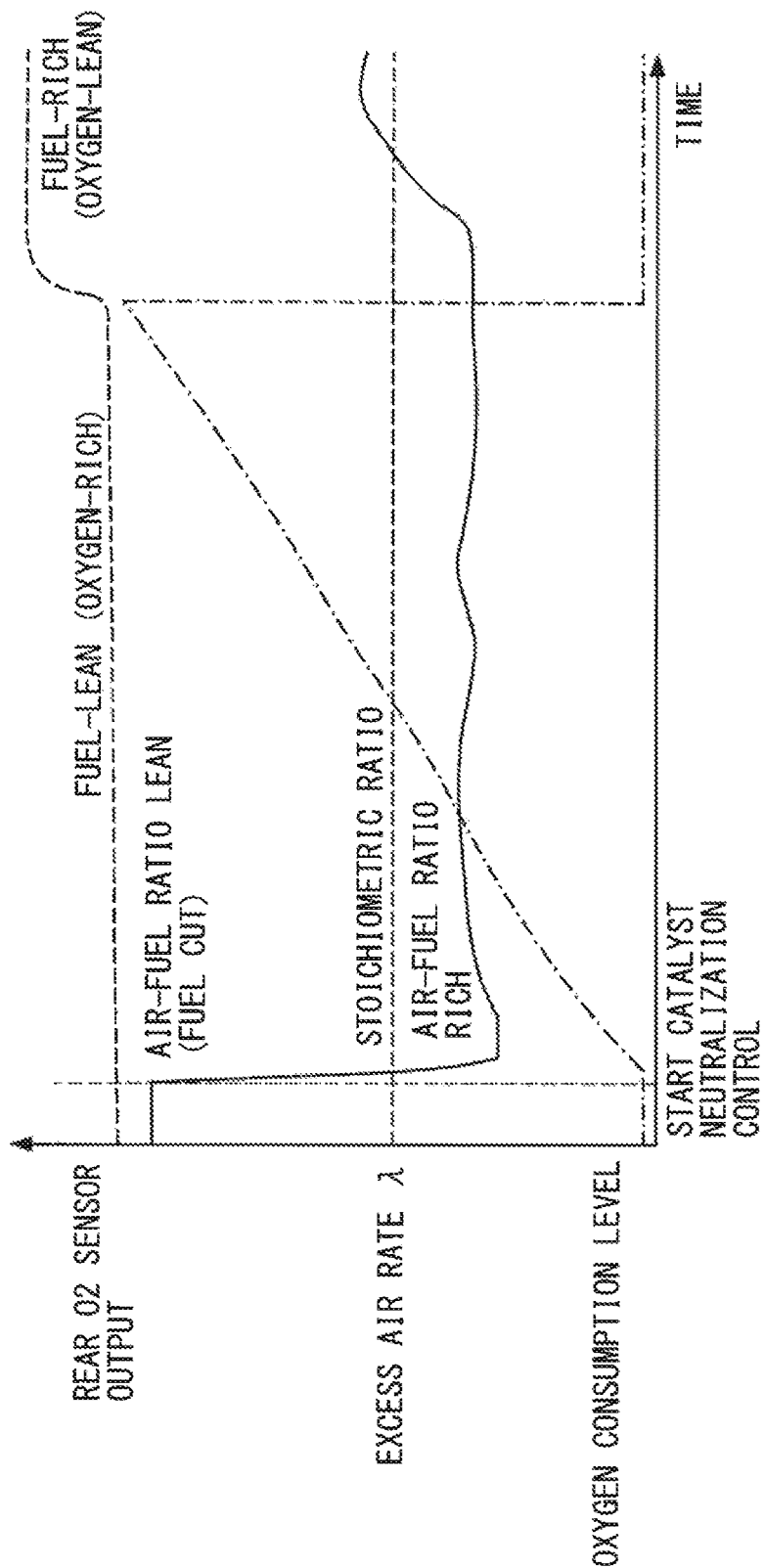
FIG. 3 is a graph illustrating the transition of the rate of excess air, the output of the rear O2 sensor, and oxygen consumption, during catalyst neutralization control performed by the power-train controlling apparatus according to an embodiment.

FIG. 3 is a graph illustrating the transition of the rate of excess air, the output of the rear O2 sensor, and the oxygen consumption level under catalyst neutralization control of the engine including the power-train controlling apparatus according to an embodiment. In FIG. 3, the horizontal axis represents time, and the vertical axis represents the rate of excess air, the output of the rear O2 sensor, and the oxygen consumption level. In FIG. 3, the rate of excess air, the output of the rear O2 sensor, and the oxygen consumption level are respectively indicated by a solid line, a dashed line, and a dash-dot line.

Upon completion of the fuel cut, the engine control unit 100 may richen the air-fuel ratio relative to the stoichiometric ratio, and may start the catalyst neutralization control. At this time, the fuel equivalent to the volume of fuel richened relative to the stoichiometric ratio may remain unburned in the cylinders, and may flow into the catalytic converter 52 in an uncombusted state. The uncombusted fuel that flows into the catalytic converter 52 may react with the oxygen stored in the catalytic converter 52 and may be oxidized or combusted. The oxygen consumption level in FIG. 3 indicates the volume of oxygen used in the oxidation reaction of the uncombusted fuel.

The output of the rear O2 sensor 54 may be on the fuel-lean side or oxygen-rich side during the fuel cut and the catalyst neutralization control. Once substantially all oxygen stored in the catalytic converter 52 is consumed, the air-fuel ratio may switch to the fuel-rich side or oxygen-lean side. Thus, the volume of oxygen consumed during the period between detection of a richened air-fuel ratio by the air-fuel ratio sensor 53 and the output of the rear O2 sensor 54 switching to the fuel-rich side is presumed to be substantially equal the oxygen storage capacity (OSC) of the catalytic converter 52. When the diagnostic value DV based on the estimated value of the oxygen storage capacity OSC falls below a predetermined threshold, it is possible to determine the catalytic converter 52 to be deteriorated.

In an engine electric hybrid vehicle provided with an engaging component (the engine clutch 120 in this example) switchable between an engaged state in which torque is transmitted between the engine 1 and the transmission (variator 140) or the motor generator 190 and a released state in which the torque transmission is blocked, catalyst deterioration diagnosis using the estimated OSC value may require fuel cut to the engine 1 or lean-out of the catalyst in an engaged state of the engaging element. However, if fuel is cut in an engaged state of the engaging element during coasting while the driver releases the accelerator pedal, the friction of the engine 1 can be transmitted to the wheels as a braking force. To counter this, the regenerative power generation capacity of the motor generator 190 could be reduced so as to achieve a deceleration rate of the vehicle equivalent to that of a released state of the engaging element. In such a case, however, the electrical power available for motor assistance can decrease, thereby impairing the energy efficiency of the vehicle.

Figure 4:
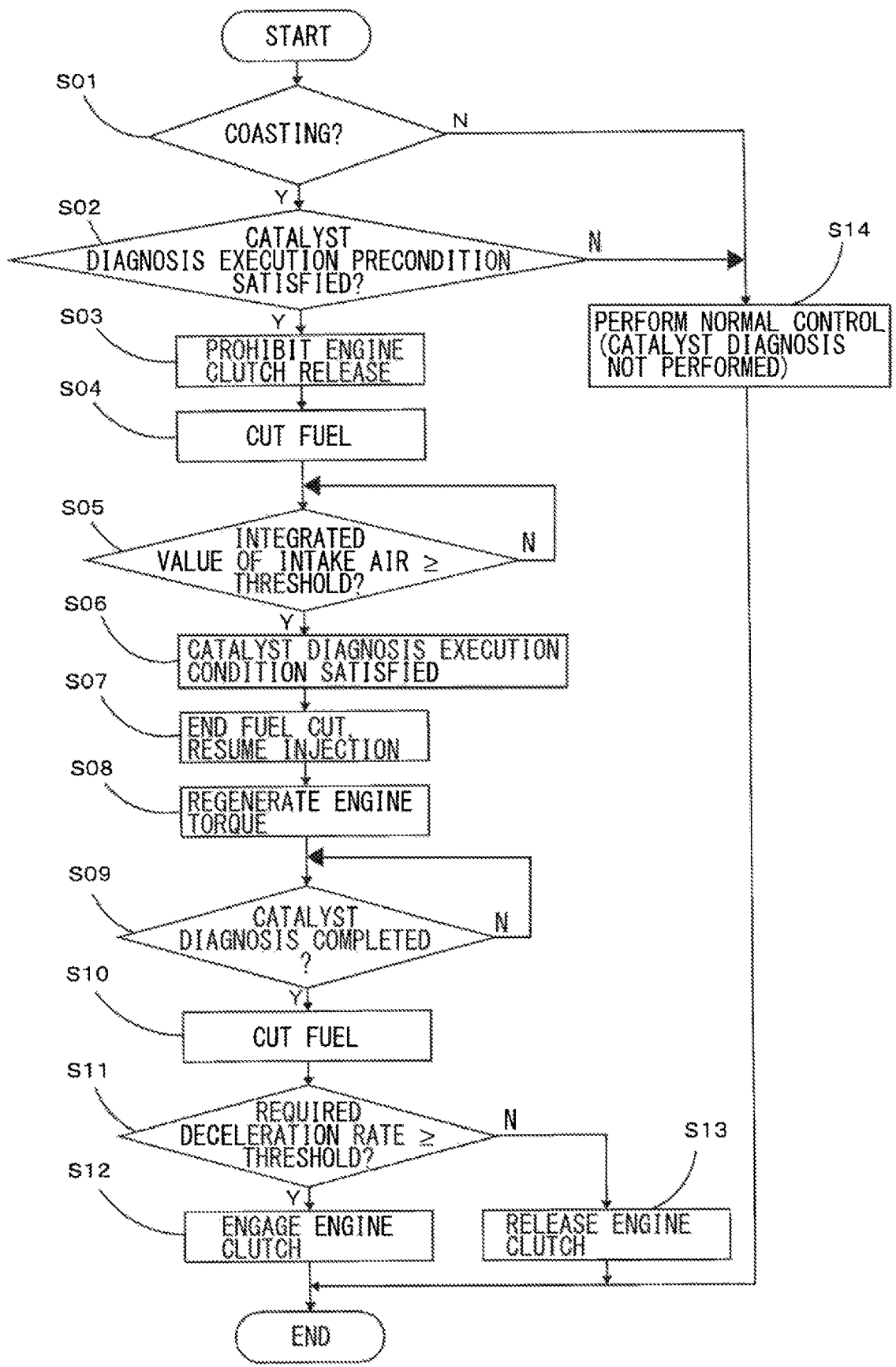
FIG. 4 is a flowchart illustrating the operation of the power-train controlling apparatus according to an embodiment of the disclosure during catalyst diagnosis.

Alternatively, catalyst deterioration diagnosis could be performed during idling of the engine 1 while the vehicle is stopped after coasting due to fuel cut. However, in such a case, the vehicle will not stop even after the catalyst is leaned out by fuel cut. Thus, if the vehicle reaccelerates in this state, the catalyst deterioration diagnosis will be uncompleted and must be redone by starting over from the fuel cut during coasting. When catalyst deterioration diagnosis using an estimated OSC value is applied to an engine electric hybrid vehicle in this way, the catalyst deterioration diagnosis could be redone many times, causing frequent reductions in the regenerative power generation capacity due to fuel cut. This leads to a concern that the energy efficiency of the vehicle may be impaired. Thus, it is desirable to suppress impairment of the energy efficiency when catalyst deterioration diagnosis using an estimated OSC value is to be performed for an engine electric hybrid vehicle. In this embodiment of the disclosure, the catalyst deterioration diagnosis is completed while the vehicle is coasting, e.g., while the vehicle is coasting with the accelerator turned off or while the vehicle is slowly decelerating. FIG. 4 is a flowchart illustrating the operation of the power-train controlling apparatus during catalyst deterioration diagnosis according to an embodiment. The operation will now be described step by step.

Step S01: Diagnosing Coasting Mode

The engine control unit 100 may instruct the required-torque establisher 101 to determine whether the vehicle is in a predetermined coasting mode. For example, if the accelerator-pedal sensor 104 detects that the degree of depression of the accelerator pedal is zero degrees or that the accelerator is turned off, and the vehicle speed is a predetermined value or higher, the required-torque establisher 101 may determine that the vehicle is in a coasting mode. If the vehicle is in a coasting mode, the engine control unit 100 may execute step S02. If not, the engine control unit 100 may execute step S13.

Step S02: Determining Satisfaction of Execution Precondition for Catalyst Diagnosis The engine control unit 100 may determine whether an execution precondition for the catalyst diagnosis, which is a condition for diagnosing the catalytic converter 52, is satisfied. The engine control unit 100 may determine that the execution precondition for the catalyst diagnosis is satisfied, for example, in the following cases: a predetermined time has elapsed after the previous diagnosis; the detected values of the various parameters, such as the temperature of the cooling water of the engine 1, and the results of self-diagnosis of the various sensors are normal; the temperatures of the catalytic converter 52 and the rear O2 sensor 54 are within predetermined normal ranges; and the air-fuel ratio sensor 53 is in a predetermined active state. If the execution precondition for the catalyst diagnosis is satisfied, the engine control unit 100 may execute step S03. If not, the engine control unit 100 may execute step S14. Note that even if the execution precondition for the catalyst diagnosis is temporarily satisfied, if either the coasting mode or the execution precondition for the catalyst diagnosis, or both, no longer hold before the catalyst deterioration diagnosis is completed, the catalyst deterioration diagnosis may be interrupted and normal control may be resumed.

Step S03: Prohibiting Engine Clutch Release

The engine control unit 100 may send a release delay request for prohibiting the release of the engine clutch 120 to the transmission control unit 210. In response to the release delay request, the transmission control unit 210 may prohibit the transition of the engine clutch 120 to a released state, and may maintain the engaged state of the engine clutch 120. Note that the lockup clutch of the torque converter 110 may be also maintained in an engaged or locked up state in response to the release delay request. The engine control unit 100 then may execute step S04.

Step S04: Cutting Fuel The engine control unit 100 may instruct the fuel injection controller 102 to cut fuel so as to stop fuel injection to the engine 1 by the injector 67. In this way, the engine 1 may enter a motoring mode in which the crankshaft is rotated by an input from the wheels. The engine control unit 100 may then execute step S05.

Step S05: Determining Integrated Value of Intake Air Volume The engine control unit 100 may calculate the integrated value of the volume of air taken in by the engine 1 on the basis of the output from the air flowmeter 45 after cutting fuel in step S04. The engine control unit 100 may then compare the calculated integrated value with a predetermined threshold. If the integrated value of the intake air is larger than or equal to the threshold, the engine control unit 100 may determine an execution condition for the catalyst deterioration diagnosis to be satisfied and executes step S06. If not, the engine control unit 100 may execute step S05.

Step S06: Execution Condition for Catalyst Diagnosis Being Satisfied The engine control unit 100 may determine that the execution condition for catalyst deterioration diagnosis is satisfied, or, in other words, the engine clutch 120 is in an engaged state, fuel is sufficiently cut for more than a predetermined time, and oxygen is stored or accumulated in the catalytic converter 52 by a volume corresponding to its oxygen storage capacity (OSC). The engine control unit 100 may then execute step S07.

Step S07: Ending Fuel Cut and Resuming Injection

The engine control unit 100 may instruct the fuel injection controller 102 to neutralize the catalyst by resuming fuel injection to the engine 1, i.e., resuming idling. The volume of injected fuel may be set to have a rich air-fuel ratio relative to the stoichiometric ratio until the catalyst diagnosis is completed or interrupted. The engine control unit 100 may then execute step S08.

Step S08: Executing Engine Torque Regeneration

The engine control unit 100 may command the motor-generator control unit 220 to increase the regenerative power generation capacity. In response to this command, the motor-generator control unit 220 may increase the regenerative power generation capacity of the motor generator 190. The increased regenerative power generation capacity may be equivalent to the torque output from the engine 1 when fuel injection to the engine 1 is resumed, and may absorb the output torque of the engine 1 to prevent fluctuation in the deceleration and the feeling of deceleration. The engine control unit 100 may then execute step S09.

Step S09: Ending Catalyst Deterioration Diagnosis

The engine control unit 100 may instruct the catalyst diagnosing unit 103 to end the diagnosis of the catalytic converter 52 when the output of the rear O2 sensor 54 switches from the fuel-lean side to the fuel-rich side after fuel injection is resumed. If the catalyst deterioration diagnosis ends, the engine control unit 100 may execute step S10. If not, the engine control unit 100 may repeat step S08.

Step S10: Cutting Fuel

The engine control unit 100 may instruct the fuel injection controller 102 to end the catalyst neutralization control and cut fuel to stop fuel injection to the engine 1. Fuel cut may be continued until a predetermined fuel cut condition is no longer satisfied. For example, fuel cut may be ended and fuel injection may be resumed when coasting ends in response to the accelerator pedal being depressed and the vehicle reaccelerating. The engine control unit 100 may then execute step S11.

Step S11: Determining Required Deceleration Rate

The engine control unit 100 may establish a required deceleration rate, which is the deceleration rate to be achieved when the accelerator is turned off, on the basis of the current traveling mode of the vehicle. It is possible to establish the required deceleration rate on the basis of, for example, the deceleration rate achieved during coasting of a typical vehicle. For example, if the driver carries out an operation that requires a higher deceleration rate, such as down-shifting of the shift operation paddle, the required deceleration rate may be set higher than that for normal operation. The threshold may be determined in consideration of the maximum deceleration rate achieved by the regenerative power generated by the motor generator 190, the friction of the power transmission mechanism, etc., while the engine clutch 120 is in a released or disengaged state. If the required deceleration rate is higher than or equal to the threshold, the engine control unit 100 may execute step S12. If not, the engine control unit 100 may execute step S13.

Step S12: Engaging Engine Clutch

The transmission control unit 210 may engage the engine clutch 120. In this way, the engine 1 may enter a state in which the crankshaft is rotated by an input from the wheels, and a braking force may be generated by friction due to mechanical loss, pumping loss, or the like. At this time, the motor generator 190 may be controlled to generate a braking force in cooperation with the friction of the engine 1 through regenerative power generation, so as to achieve a deceleration rate of the vehicle that equals the required deceleration rate. The power-train controlling apparatus (the engine control unit 100, the transmission control unit 210, and the motor-generator control unit 220) may end the process ("return").

Step S13: Releasing Engine Clutch

The transmission control unit 210 may release the engine clutch 120. In this way, the engine 1 may be disengaged from the wheels and the motor generator 190, and fuel may be cut to stop the rotation of the crankshaft. The vehicle may coast while the engine 1 is stopped. At this time, the motor generator 190 may generate regenerative power so as to achieve a deceleration rate of the vehicle equal to the above-described required deceleration rate, and may generate a braking force. The power-train controlling apparatus may then end the process ("return").

Step S14: Performing Normal Control

The power-train controlling apparatus (the engine control unit 100, the transmission control unit 210, and the motor-generator control unit 220) may perform normal control when the catalyst deterioration diagnosis is not being performed. The power-train controlling apparatus may then end the process ("return").

Figure 5:
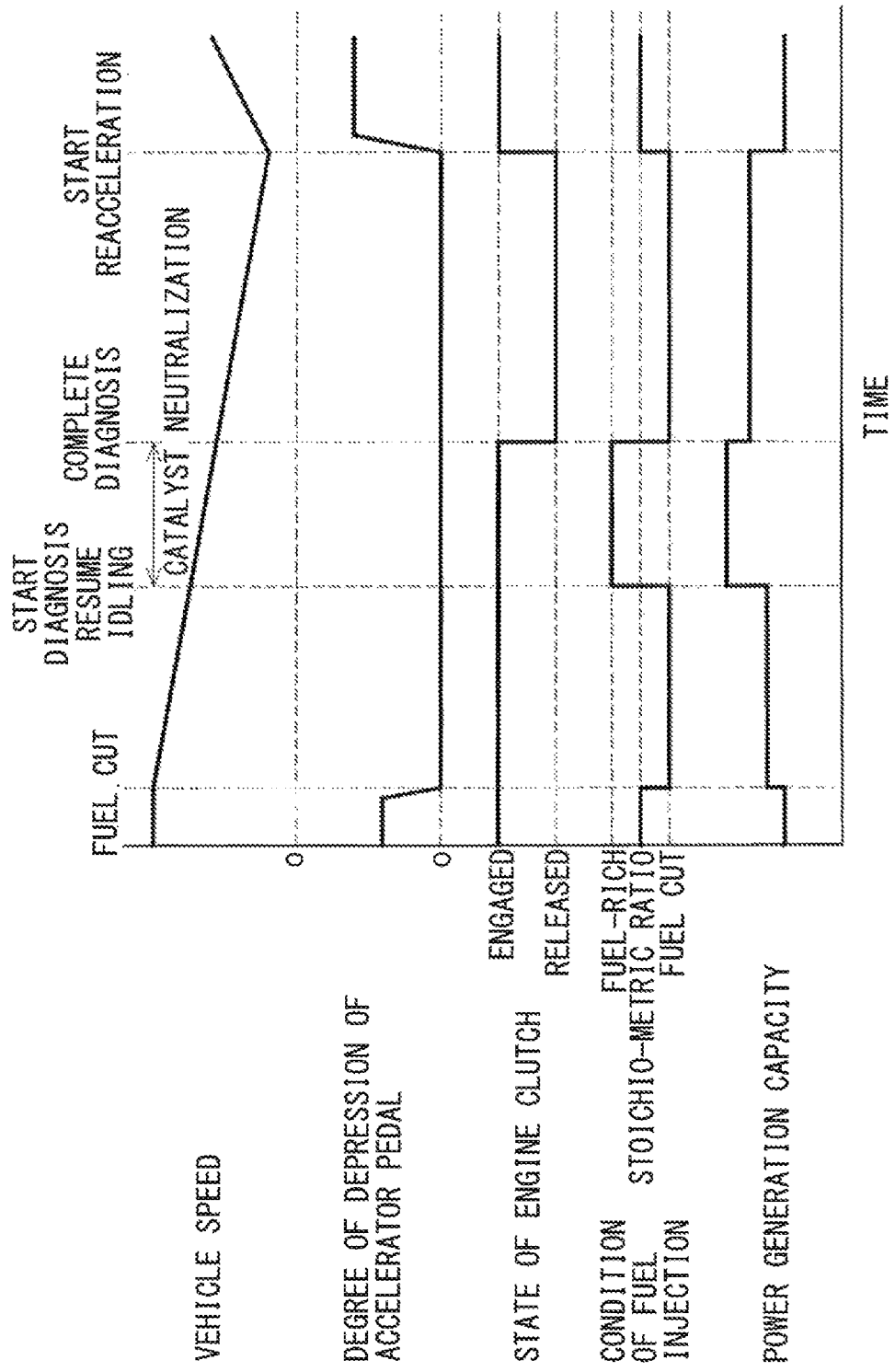
FIG. 5 is a timing chart schematically illustrating an example of the transition of the vehicle speed, the depression of an accelerator pedal, the state of an engine clutch, the condition of the injected fuel, and the capacity of regenerative power generation, during catalyst diagnosis of a vehicle including the power-train controlling apparatus according to an embodiment.

FIG. 5 is a timing chart schematically illustrating an example of the transition of the vehicle speed, the degree of depression of the accelerator pedal, the state of the engine clutch, the condition of the injected fuel, and the shift in the capacity of regenerative power generation, during catalyst diagnosis of a vehicle including the power-train controlling apparatus according to an embodiment. In FIG. 5, the horizontal axis represents time, and the vertical axis represents vehicle speed (high at the top of the chart), the degree of depression of the accelerator pedal (high at the top of the chart), the state of the engine clutch (engaged or disengaged state), the condition of fuel injection (fuel-rich, stoichiometric, or fuel cut), and regenerative power generation capacity (high at the top of the chart).

FIG. 5 illustrates the series of states of the vehicle. Specifically, the vehicle may be diagnosed for catalyst deterioration under fuel cut and the subsequent catalyst neutralization control after the vehicle enters a coasting mode in response to the accelerator pedal being completely released (accelerator being turned off) from a state of a constant accelerator opening; the vehicle may continue coasting while fuel is cut and the engine clutch is being released after completion of the catalyst deterioration diagnosis; and finally the vehicle may reaccelerate in response to the accelerator pedal being depressed.

First, the degree of depression of the accelerator pedal may be decreased to zero to a fully returned state in which the accelerator is turned off. In the example illustrated in FIG. 5, it may be determined that the vehicle is in a coasting mode (step S01) and the execution condition for the catalyst deterioration diagnosis is satisfied (step S02); and then the release of the engine clutch may be prohibited (step S03) and fuel may be cut (step S04). At this time, the motor generator 190 may start generating regenerative power so as to appropriately decelerate the vehicle. In this state, however, the engine clutch 120 may be in an engaged state, and the friction of the engine 1 may be transmitted to the wheels as a braking force. Thus, the regenerative power generation capacity of the motor generator 190 may be set to be smaller than that during normal coasting so as to prevent an increase in the deceleration rate of the vehicle when the engine clutch 120 is released and the vehicle enters a coasting mode.

Subsequently, when the integrated value of the intake air volume after fuel cut is started becomes larger than or equal to the threshold (step S05), the execution condition for the catalyst deterioration diagnosis may be satisfied (step S06), the fuel injection to the engine 1 may be resumed, i.e., idling may be resumed (step S07), and catalyst neutralization may be started by setting the air-fuel ratio to the fuel-rich side. At this time, the fluctuation in the deceleration rate and the feeling of deceleration of the vehicle due to the torque generated by the engine 1 may be suppressed by increasing the regenerative power generation capacity of the motor generator 190 in comparison to that before idling is resumed (Step S08).

When the catalyst deterioration diagnosis is completed (step S09), fuel consumption may be suppressed while the regenerative power generation capacity of the motor generator 190 is increased. This enhances the energy efficiency of the vehicle, and fuel may be cut again (Step S10). In the case illustrated in FIG. 5, the required deceleration rate of the vehicle may be relatively small, and thus a deceleration rate corresponding to the required deceleration rate may be achieved even when the engine clutch 120 is released or disengaged (the process may proceed to "N" in step S11). Then, the engine clutch 120 may be released (Step S13). The engine 1 may enter a state in which the rotation of the crankshaft is stopped due to fuel cut and the release of the engine clutch 120. In this state, the engine 1 may be decoupled from the wheels and the motor generator 190. At this time, the friction of the engine 1 does not contribute to the braking force applied to the vehicle, unlike when fuel is cut during catalyst deterioration diagnosis. Thus, the regenerative power generation capacity of the motor generator 190 may be set to be large in comparison with that during the previous fuel cut. When the required deceleration rate is high and a sufficient deceleration rate is unachievable through mere regeneration by the motor generator 190, such as when the driver shifts down, the engine clutch 120 may be engaged so that the friction of the engine 1 is usable as a braking force.

Then, when the driver depresses the accelerator pedal to request reacceleration, the vehicle may resume the normal control. In the example illustrated in FIG. 5, the engine 1 may resume fuel injection in response to the increase in the depression of the accelerator pedal under air-fuel ratio feedback control for approximating the actual air-fuel ratio to the stoichiometric ratio. The engine clutch 120 and the lockup clutch of the torque converter 110 that are in a disengaged state may be engaged. This may restart the engine 1 and control the engine 1 to generate actual torque in accordance with the required torque established by the required-torque establisher 101 on the basis of depression of the accelerator pedal. At this time, the motor generator 190 may prioritize the acceleration of the vehicle and interrupt the regenerative power generation.

Note that when the degree of depression of the accelerator pedal is large, an assisting torque may be generated by the motor generator 190.

As described above, the embodiments achieve the following advantageous effects.

(1) Cutting fuel while the engine clutch 120 is engaged and resuming fuel injection while maintaining the engaged state of the engine clutch 120 during coasting allows the catalyst deterioration diagnosis to be completed while the vehicle is coasting. This reduces the frequency of redoing the catalyst deterioration diagnosis due to cancellation of the diagnosis before completion of the diagnosis, compared with the frequency in a case in which the diagnosis execution condition requires the vehicle to be stopped in an idling mode. This reduces the energy lost during the catalyst deterioration diagnosis, and thereby is able to enhance the energy efficiency of the vehicle.

(2) The torque generated under the catalyst neutralization control by the engine 1 as a result of the fuel injection to the engine 1 being resumed while the engaging element is engaged may be absorbed by the regenerative power generation by the motor generator 190. This is able to suppress fluctuation in the deceleration rate of the vehicle due to the idling mode being resumed.

(3) It is possible to resume fuel cut after completion of the catalyst deterioration diagnosis so as to suppress fuel consumption.

(4) The friction of the engine 1 is suppressed or prevented from acting on the wheels as a braking force due to the release of the engine clutch 120 during fuel cut after completion of the catalyst deterioration diagnosis, and it is possible to increase the regenerative power generation capacity of the motor generator 190 to achieve the equivalent deceleration rate. It is also possible to increase the distance travelled by the vehicle in a coasting mode by reducing the deceleration rate of the vehicle while cutting fuel.

Modification

The disclosure should not be construed to be limited by the embodiments described above, and various changes and modifications are possible within the technical scope of the disclosure.

(1) The configuration of the power train including the engine, the electric rotating machine, the transmission mechanism, and the engaging element should not be limited by the embodiments described above and may be appropriately modified. For example, the power train according to at least one of the foregoing embodiments includes a chain type CVT as a transmission mechanism, and a single motor generator. However, the type and configuration of the transmission mechanism may be appropriately modified, and multiple electric rotating machines may be provided.

(2) In at least one of the foregoing embodiments, the engine is a direct injection (in-cylinder injection) naturally aspirated engine. Alternatively, the engine may be, for example, a supercharged engine including a turbocharger, a mechanical supercharger, or the like, an engine that performs port injection, or an engine that uses both in-cylinder injection and port injection. Furthermore, the cylinder layout and the number of cylinders are also not particularly limited.

As described above, the power train of an engine electric hybrid vehicle according to the disclosure is able to suppress impairment of energy efficiency caused by catalyst deterioration diagnosis.

Although some example configurations, example processing, and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The invention claimed is:

1. A power-train controlling apparatus configured to control a power train of an engine electric hybrid vehicle, the power-train being provided with an engine, a catalytic converter, an oxygen-level sensor, an engaging element, and an electric rotating machine,
   the catalytic converter being coupled with the engine and configured to receive exhaust gas of the engine,
   the oxygen-level sensor being disposed downstream of the catalytic converter along a flow of the exhaust gas and being configured to detect an oxygen level of the exhaust gas,
   the engaging element being disposed in a power transmission path through which an output torque of the engine is transmitted to a wheel, the engaging element being configured to switch between an engaged state in which torque transmission is established between the engine and the wheel and a released state in which the torque transmission is blocked,
   the electric rotating machine being coupled with the engine and being configured to receive the output torque of the engine and generate regenerative power,
   the power-train controlling apparatus comprising:
   a fuel injection controller configured to stop fuel injection to the engine during coasting of the vehicle while the engaging element is in the engaged state, introduce a predetermined volume of oxygen to the catalytic converter, and resume the fuel injection in a fuel-rich state while the vehicle is running;

a catalyst diagnosing unit configured to diagnose the catalytic converter on a basis of a variation in an output of the oxygen-level sensor after the resuming of the fuel injection by the fuel injection controller; and an engaging-element controller configured to prohibit transition of the engaging element to the released state during a period between the stopping of the fuel injection and completion of the diagnosing of the catalytic converter by the catalyst diagnosing unit.

2. The power-train controlling apparatus according to claim 1, further comprising:

a regenerative-power-generation controller configured to increase regenerative power generation capacity of the electric rotating machine in response to the resuming of the fuel injection during the coasting.

3. The power-train controlling apparatus according to claim 2, wherein the fuel injection controller stops the fuel injection when the coasting is continuing after the completion of the diagnosis of the catalytic converter by the catalyst diagnosing unit.

4. The power-train controlling apparatus according to claim 3, wherein the engaging-element controller shifts the engaging element to the released state after the completion of the diagnosis of the catalytic converter by the catalyst diagnosing unit and the stopping of the fuel injection.

5. The power-train controlling apparatus according to claim 1, wherein the fuel injection controller stops the fuel injection when the coasting is continuing after the completion of the diagnosis of the catalytic converter by the catalyst diagnosing unit.

6. The power-train controlling apparatus according to claim 5, wherein the engaging-element controller shifts the engaging element to the released state after the completion of the diagnosis of the catalytic converter by the catalyst diagnosing unit and the stopping of the fuel injection.

7. A method of controlling a power train of an engine electric hybrid vehicle, the power train provided with an engine and an electric rotating machine configured to receive an output torque from the engine and generate regenerative power, the method comprising:

performing fuel cut that stops fuel injection to the engine during coasting of the vehicle in a state in which torque is transmittable from the engine to a wheel;

resuming the fuel injection in a fuel-rich state while the vehicle is running, after introducing, through the fuel cut, a predetermined volume of oxygen to a catalytic converter that processes exhaust gas from the engine;

detecting an oxygen level of the exhaust gas downstream of the catalytic converter after the resuming of the fuel injection;

diagnosing a catalyst deterioration state of the catalytic converter on a basis of a detected oxygen level of the exhaust gas; and maintaining the state in which the torque is transmittable during a period between the stopping of the fuel injection and completion of the diagnosing of the catalytic converter.

* * * * *